United States Patent Office 3,206,515
Patented Sept. 14, 1965

3,206,515
PREPARATION OF CHLOROFLUOROCARBONS
Franciszek Olstowski, Freeport, and John D. Watson, Sr., Lake Jackson, Tex., assignors to The Dow Chemical Company, Midland, Mich., a corporation of Delaware
No Drawing. Filed July 12, 1962, Ser. No. 209,288
8 Claims. (Cl. 260—653.8)

This invention relates to a method for preparing chlorofluorocarbons and more particularly is concerned with an improved process for preparing fluorochloro substituted alkanes from chlorosubstituted alkanes and fluorspar.

The general method for preparing fluorinated chloroalkanes by reacting fluorspar ($CaF_2$) with chloro-substituted alkanes is known. However, heretofore in the processes used to carry out this reaction, the amount of fluorine converted from $CaF_2$ into the organic fluoro substituted compound has been low. The prime reason set forth in the art for the low conversion of fluorine was the formation of a $CaCl_2$ film on the surface of the fluorspar particle which surface film encompassed the $CaF_2$ particle and prevented further contact of this inorganic fluoride reactant with the chloroalkane. (See, for example, U.S. Patent 2,739,989.)

Many methods have been proposed and employed in an attempt to circumvent or overcome this problem. These include, for example, the use of extremely finely divided $CaF_2$ or the use of diluent particles of carbon, $SiO_2$ or $Al_2O_3$ in a fluidized bed of $CaF_2$ as attrition agents to erode the suspected $CaCl_2$ film from the fluorspar particle. However, even these modifications have not produced any marked increase in yield of the desired chlorofluoroalkanes.

Now unexpectedly it has been found that high yields of chlorofluoroalkanes markedly improved over that obtained by the prior art methods can be produced by the present improved novel process. In accordance with this process, high yields of chlorofluoroalkanes are obtained by reacting calcium fluoride and a chlorosubstituted hydrocarbon in the presence of potassium chloride (KCl). In this process, the $KCl/CaF_2$ molar ratio employed ranges from about 0.5 to about 3, but preferably is about 1.

The chlorosubstituted hydrocarbons suitable for use in the instant process are the partially and completely substituted chloro-alkanes-alkenes, and alicyclic alkanes, wherein the carbon chain length ranges from 1 to about 6. This process is particularly suited for use in preparing chlorofluorosubstituted methanes and alkanes. Particularly effective chloroalkane reactants are $CH_3Cl$, $CH_2Cl_2$, $CHCl_3$, $CCl_4$, $C_2H_5Cl$, $C_2H_4Cl_2$, $C_2H_3Cl_3$, $C_2H_2Cl_4$, $C_2HCl_5$ and $C_2Cl_6$. In carrying out the process, either a single chlorosubstituted hydrocarbon, or a mixture of the hydrocarbons can be used.

Catalytic amounts of reaction promoters such as the substantially anhydrous chlorides or iron, nickel, antimony, or chromium, hydrogen chloride or chlorine itself and mixtures thereof also can be used if desired in the present process. Conveniently the metal chlorides can be generated in situ in the reaction mass by employing a mixture of finely divided metal and chlorine or hydrogen chloride.

In carrying out the present process, a mixture of $CaF_2$ and a chlorosubstituted hydrocarbon is placed in a suitable reactor along with a predetermined amount of potassium chloride as set forth hereinbefore, and a reaction promoter catalyst, if desired. The ratio of $CaF_2$ to the cholorsubstituted hydrocarbon is not critical although ordinarily these reactants are employed at a $CaF_2$/chlorosubstituted hydrocarbon ratio of from about 0.5 to about 2.

The reaction mixture in the reactor is subjected to a temperature of from about 150° C. to about 700° C., and preferably of from about 350° C. to about 600° C. at atmospheric or superatmospheric pressures up to 1000 pounds per square inch gauge or more for a period of time sufficient to react a predetermined quantity of the fluoride from the inorganic calcium fluoride with the chlorosubstituted hydrocarbon. Reaction times of from about 0.5 hour to about 12 hours or more have been found to be satisfactory.

The materials of construction for the reactor vessel and allied process equipment are limited only in that they do not react detrimentally with the reactants or reaction products and have the physical characteristics and structural strength to stand up under the reaction temperatures and pressures employed. Stainless steel, nickel and stainless steel or nickel lined reactors are particularly suitable for use in the instant process.

The reaction is carried out in any of a wide variety of non-pressurizable and pressurizable stationary or rotatable reactor vessels as known to one skilled in the art. Ordinarily a batch type operation is used. However, a continuous, cyclic or other type operation can be used.

Although we do not desire to be bound to any particular theory or reason for explaining the high results obtained by our instant process, during the course of the present work it was discovered that while film formation of $CaCl_2$ on the surface of the calcium fluoride reactant may offer some hindrance to completing the reaction, the ultimate limiting factor in reacting $CaF_2$ with chlorosubstituted hydrocarbons appears to be formation of the complex $CaF_2 \cdot CaCl_2$ material. (This complex sometimes is designated as CaFCl). In control studies, a carefully prepared complex, corresponding to this formula, when used as the inorganic fluorine source, has been found not to fluorinate chlorosubstituted hydrocarbons. By incorporating KCl into the reaction mixture as set forth hereinbefore in accordance with the instant novel process, formation of the complex salt $CaCl_2 \cdot KCl$ has been noted. By so tying up the $CaCl_2$ reaction by-product, the undesirable $CaCl_2$ surface film formation on the $CaF_2$ reactant or the build up of a complex unreactive inorganic calcium fluoride-calcium chloride salt in the reaction mixture apparently is eliminated and the desired $CaF_2$-chlorosubstituted hydrocarbon reaction readily proceeds to give high yields of the fluorinated hydrocarbon.

Another advantage of the present process is that the $CaCl_2 \cdot KCl$ complex can be recovered and separated into its constituents by treatment with water. The KCl content can be leached from the solid complex and recrystallized for use in subsequent reaction.

The following examples will serve to illustrate further the improved process of the present invention but are not meant to limit it thereto.

*Example 1*

A tube-type pressurizable nickel reactor of about 200 cubic centimeters internal volume was charged with about 19.2 grams (0.26 gram mole) of KCl, about 10 grams (0.13 gram mole) of $CaF_2$ and about 28 grams (0.18 gram mole) of $CCl_4$. Additionally, about 2 grams of iron powder and about 4 grams of chlorine were added as a reaction catalyst.

The reactor was pressurized to about 500 pounds per square inch gauge and rotated at a speed of about 20 revolutions per minute in a furnace maintained for about 6 hours at about 500° C.

At the end of the run the product mixture was recovered and analyzed by infrared technique. This mixture showed the following fluorinated products to be present:

| | Mole percent |
|---|---|
| $CFCl_3$ | 40.9 |
| $CF_2Cl_2$ | 58.5 |
| $CF_3Cl$ | 0.6 |

A material balance of the fluorosubstituted methane products indicated that 94 mole percent of the $CaF_2$ was converted and the yield of the fluorosubstituted methanes, based on $CCl_4$ starting material, was about 100 percent. Chloride analysis of the solid bed remaining after the reaction indicated about 97 percent conversion of the $CaF_2$ reactant.

Example 2

About 20 grams KCl, 20 grams $CaF_2$ (1/1 gram mole ratio of $CaF_2$/KCl) and about 29 grams of $CCl_4$ were placed in a stainless pressurizable steel reactor, having a volume of about 400 cubic centimeters. The reactor and contents were heated in a furnace at about 400° C. and a pressure of about 600 pounds per square inch gauge for about 12 hours. At the end of this time, about 3800 cubic centimeters of gas were recovered. This, upon infrared analysis indicated the presence of the following fluorinated alkanes:

| | Mole percent |
|---|---|
| $CFCl_3$ | 5.2 |
| $CF_2Cl_2$ | 41.3 |
| $CF_3Cl$ | 42.3 |
| $CF_4$ | Trace |

Additionally, about 13 cubic centimeters of a liquid were recovered which upon infrared analysis was found to be about 30 mole percent $CFCl_3$ and about 70 mole percent of $CCl_4$ reactant.

A material balance was run on the fluorosubstituted products and showed that about 74 percent of the $CaF_2$ charged to the reactor was converted. Chloride analysis of the solid residue indicated about a 75 mole percent conversion of the $CaF_2$. X-ray analysis if this solid residue showed the presence of the $CaCl_2 \cdot KCl$ complex.

In a control study, about 20 grams of $CaF_2$ and about 72 grams of $CCl_4$ were charged to the reactor but the KCl was not used. For this run, the reactor plus contents was placed in a furnace and heated at about 400° C. and about 750 pounds per square inch gauge for about 6 hours. After the run, the product mixture was recovered and analyzed. Analysis indicated about 45 mole percent of the $CaF_2$ charged had been converted into fluoro substituted alkanes. The solid residue, upon X-ray analysis was found to be essentially all $CaF_2 \cdot CaCl_2$.

Additional control runs were made wherein the only variable that was changed was the length of the reaction time which was increased to 12 and 24 hours respectively for separate runs. Analysis of the reaction product mixture obtained from the lengthened runs indicated a 46 mole percent conversion into fluorinated alkane products of the $CaF_2$ charged for the 12 hour run and about 45 mole percent conversion for the 24 hour run.

The product yield of about 75 mole percent based on $CaF_2$ conversion, obtained by the present process as compared to conversions of about 45 mole percent obtained by following conventional techniques clearly points out the effectiveness and utility of the present improved process.

Example 3

About 10 grams of $CaF_2$, 28 grams of $CCl_4$, and 19 grams of KCl (about 0.5 gram mole ratio of $CaF_2$/KCl) were placed in a 200 cc. nickel reactor. In addition, 2.35 grams of $SbCl_5$ were also added as a reaction promoter. The reactor and contents were heated in a furnace to 500° C. at a pressure of approximately 500 per square inch gauge for about 6 hours.

At the end of this period, the chlorofluorocarbon product was recovered from the reactor and analyzed by infrared methods. The chlorofluorocarbon product collected demonstrated a 61% conversion of the $CaF_2$ charged.

In a separate run, identical amounts of $CaF_2$, $CCl_4$, and KCl as above were reacted with 0.6 gram of $Cl_2$ and 0.25 gram of HCl in turn at 500° C. at a pressure of 500 per square inch gauge for 6 hours. The $CaF_2$ converted when using $Cl_2$ as a promoter was found to be 60.3%. When using HCl as a promoter, the $CaF_2$ conversion was 61.7% based on recovered chlorofluorocarbons.

Example 4

Ten grams of $CaF_2$, 28 grams of $CCl_4$, and 19.2 grams of KCl were placed in a 200 cc. nickel reactor. To this mixture was added 6 grams of anhydrous $FeCl_3$. The reactor was then heated to 500° C. and maintained at this temperature for 1 hour. The reactor pressure at this temperature was approximately 500 per square inch gauge.

At the end of the reaction period, the chlorofluorocarbon products were recovered from the reactor and analyzed by infrared methods. The ratio of the fluorochlorocarbon products were:

| | Mole percent |
|---|---|
| $CFCl_3$ | 46.9 |
| $CF_2Cl_2$ | 36.6 |
| $CF_3Cl$ | 13.8 |

Chloride analysis of the solid bed after the reaction showed that 82 percent of the $CaF_2$ charged was converted and a material balance of the chlorofluoromethanes indicated 84 percent of the $CaF_2$ was converted.

In a manner similar to that shown for the foregoing examples, 1,1-dichloro propane, 1,2,3-trichloropropane, 1,2,3,4,5,6-hexachlorocyclohexane, monochlorocyclohexane, 1-chlorohexane, 2-chlorobutadiene 1,3,1,2-dichloroethane, tetrachloroethylene, hexachloroethane, and the like can be reacted with a $KCl-CaF_2$ mixture as set forth hereinbefore to provide chlorofluorosubstituted hydrocarbons in high yield.

Various modifications can be made in the present invention without departing from the spirit or scope thereof for it is understood that we limit ourselves only as defined in the appended claims.

We claim:

1. A process for preparing chlorofluoro substituted hydrocarbons which comprises;
    (1) providing a mixture of calcium fluoride, a chlorosubstituted hydrocarbon and potassium chloride having a $KCl/CaF_2$ molar ratio of from about 0.5 to about 3 and a $CaF_2$/chlorosubstituted hydrocarbon ratio of from about 0.5 to about 2, said chlorosubstituted hydrocarbon being a member selected from the group consisting of substituted chloroalkanes, chloroalkenes, chloroalicyclic alkanes and mixtures thereof wherein the number of carbon atoms of said chlorosubstituted hydrocarbon ranges from 1 to 6
    (2) subjecting the reaction mixture to a temperature of from about 150° to about 700° C., at a pressure up to about 1000 pounds per square inch gauge.

2. The process as defined in claim 1 wherein a catalytic amount of a reaction promoter selected from the group consisting of iron chloride, nickel chloride, antimony chloride, chromium chloride, hydrogen chloride and chlorine is incorporated into the reaction mixture.

3. A process for preparing chlorofluoro substituted hydrocarbons which comprises;
    (1) providing a reaction mixture of a chlorosubstituted hydrocarbon, calcium fluoride and potassium chloride wherein the chlorosubstituted hydrocarbon is a member selected from the group consisting of substituted chloroalkanes, chloroalkenes, chloroalicyclic alkanes and mixtures thereof wherein the number of carbon atoms of said chlorosubstituted hydrocarbon ranges from 1 to 6, a carbon chain length ranging from 1 to about 6 and wherein the $KCl/CaF_2$ molar ratio is about 1 and the $CaF_2$/chlorosubstituted hydrocarbon ratio is from about 0.5 to about 2,
(2) reacting said mixture at a pressure ranging from about atmospheric pressure up to about 1000 pounds per square inch gauge at a temperature of from about 350° C. to about 600° C. for a period of time ranging from about 1 to about 12 hours,
(3) separating the fluorochloro substituted hydrocarbons from the reaction mixture.

4. The process as defined in claim 3 wherein the chlorosubstituted hydrocarbon reactant is a chlorosubstituted methane.

5. The process a defined in claim 3 wherein there is incorporated into the reaction mixture a catalytic amount of a reaction promoter selected from the group consisting of iron chloride, nickel chloride, antimony chloride, chromium chloride, hydrogen chloride and chlorine.

6. A process for preparing fluorochlorosubstituted methane which comprises;
(1) providing a reaction mixture consisting essentially of $KCl$, $CaF_2$ and carbon tetrachloride, said mixture having a $KCl/CaF_2$ gram molar ratio of about 2 and said mixture having a $CaF_2/CCl_4$ gram molar ratio of about 0.7, and incorporating into said mixture a catalytic amount of powdered iron and chlorine,
(2) reacting said mixture in a nickel reactor at a temperature of about 500° C. and a pressure of about 500 pounds per square inch gauge for about six hours,
(3) recovering the chlorofluorosubstituted methane from the reaction mixture.

7. In a process for preparing chlorofluoro substituted hydrocarbons by the reaction of chlorosubstituted hydrocarbons selected from the group consisting of substituted chloroalkanes, chloroalkenes, chloroalicyclic alkanes and mixtures thereof wherein the number of carbon atoms of said chlorosubstituted hydrocarbons range from 1 to 6 and calcium fluoride the improvement which comprises; incorporating potassium chloride into the reaction mixture whereby the $KCl/CaF_2$ molar ratio in said mixture is from about 0.5 to about 3.

8. The process as defined in claim 3 wherein the chlorosubstituted hydrocarbon reactant is a chlorosubstituted ethane.

References Cited by the Examiner
UNITED STATES PATENTS

| | | | |
|---|---|---|---|
| 1,914,135 | 6/33 | Lacy | 260—653.8 |
| 2,013,062 | 9/35 | Midgley et al. | 260—653.8 |
| 2,673,884 | 3/54 | Thomas | 260—653 |

LEON ZITVER, *Primary Examiner.*
DANIEL D. HORWITZ, *Examiner.*